United States Patent
Chen et al.

(10) Patent No.: US 8,163,055 B2
(45) Date of Patent: Apr. 24, 2012

(54) FILTER HOUSING STRUCTURE OF PROJECTOR

(75) Inventors: Wei-Ju Chen, Hsinchu (TW); Hung-Lin Lee, Hsinchu (TW)

(73) Assignee: Coretronic Corporation, Hsin-Chu (TW)

(*) Notice: Subject to any disclaimer, the term of this patent is extended or adjusted under 35 U.S.C. 154(b) by 384 days.

(21) Appl. No.: 12/461,484

(22) Filed: Aug. 13, 2009

(65) Prior Publication Data

US 2010/0050579 A1  Mar. 4, 2010

(30) Foreign Application Priority Data

Aug. 27, 2008 (TW) ................. 97132647 A (51) Int. Cl.
*B01D 46/00* (2006.01)
(52) U.S. Cl. ............... 55/495; 55/320; 55/327; 55/501; 55/505; 55/DIG. 31
(58) Field of Classification Search ............ 55/490, 55/494, 495, 501, 503, DIG. 31, 307, 320, 55/327, 507
See application file for complete search history.

(56) References Cited

U.S. PATENT DOCUMENTS

| | | | | |
|---|---|---|---|---|
| 5,462,569 A | * | 10/1995 | Benjamin | 55/385.6 |
| 5,766,285 A | * | 6/1998 | Killman | 55/385.6 |
| 5,792,230 A | * | 8/1998 | Moore et al. | 55/493 |
| 6,572,231 B1 | * | 6/2003 | Watanabe | 353/58 |
| 6,829,110 B2 | * | 12/2004 | Watanabe | 359/822 |
| 6,961,165 B2 | * | 11/2005 | Uehara | 359/237 |
| 7,811,346 B1 | * | 10/2010 | Henson | 55/385.1 |
| 2004/0074214 A1 | * | 4/2004 | Henson | 55/501 |

FOREIGN PATENT DOCUMENTS

| | | |
|---|---|---|
| TW | 369133 | 9/1999 |
| TW | 542010 | 7/2003 |
| TW | 553325 | 9/2003 |
| TW | M268957 | 7/2005 |

* cited by examiner

*Primary Examiner* — Robert Clemente
(74) *Attorney, Agent, or Firm* — Bacon & Thomas, PLLC (57) ABSTRACT

A filter housing structure adapted to a projector having a first encircled hook-and-loop fastening layer, a housing, a filtering layer, and a second encircled hook-and-loop fastening layer is provided. The first encircled hook-and-loop fastening layer is fixed on the casing of the projector and surrounds the openings arrayed on the casing. The housing has a central portion and a boundary portion. The central portion has a plurality of through holes thereon corresponding to the openings of the casing. The boundary portion surrounds the central portion and is corresponding to the first encircled hook-and-loop fastening layer. The filtering layer is assembled in the central portion and is disposed between the through holes and the openings for shielding the through holes. The second encircled hook-and-loop fastening layer is fixed on the boundary portion for fastening the housing to the first encircled hook-and-loop fastening layer.

12 Claims, 6 Drawing Sheets

FILTER HOUSING STRUCTURE OF PROJECTOR

BACKGROUND OF THE INVENTION (1) Field of the Invention

This invention relates to a projector, and more particularly to a filter housing structure adapted to a projector.

(2) Description of the Prior Art

Figure 1:
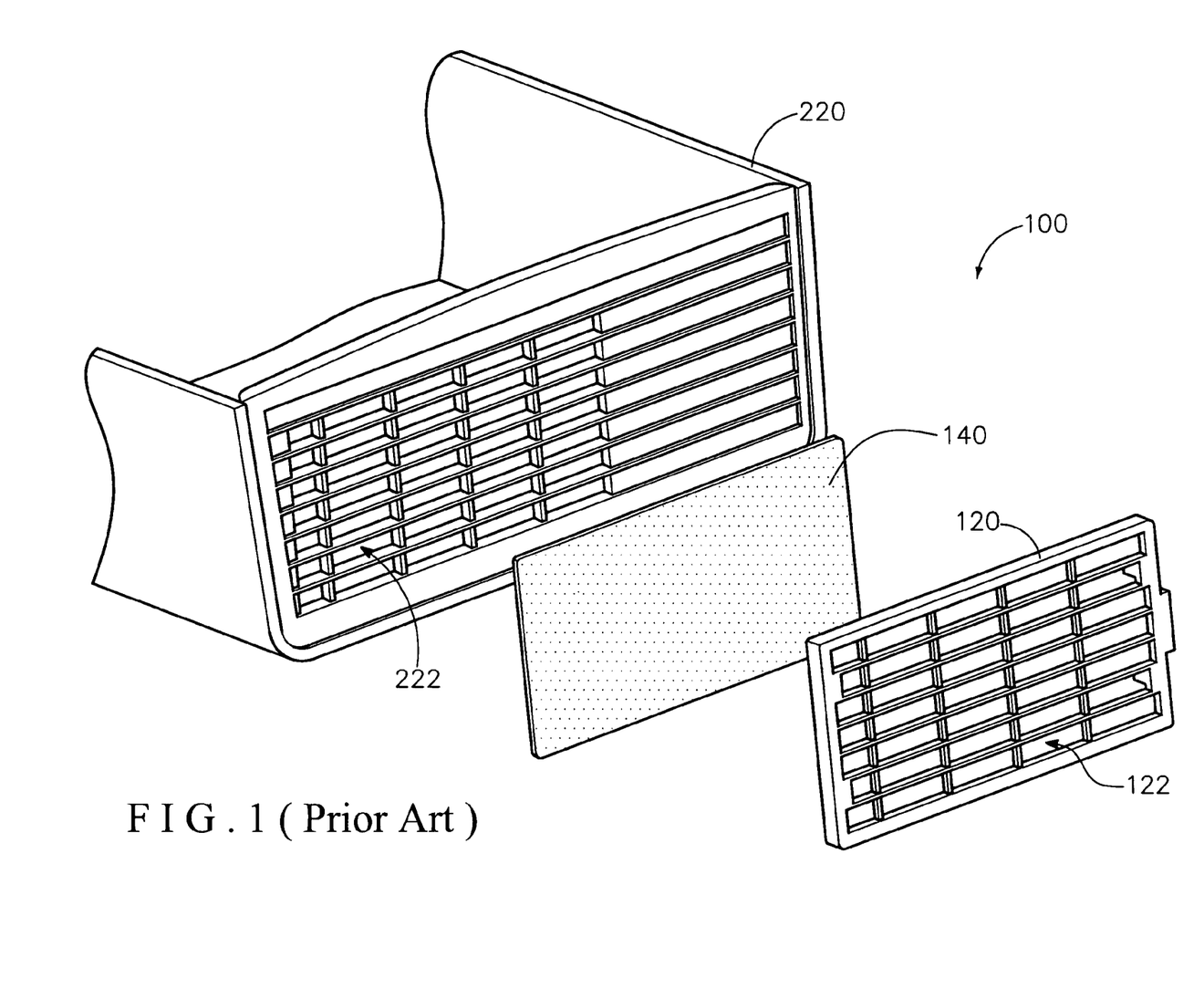
FIG. 1 is a schematic view of a typical filter housing structure of a projector.
Figure 1A:
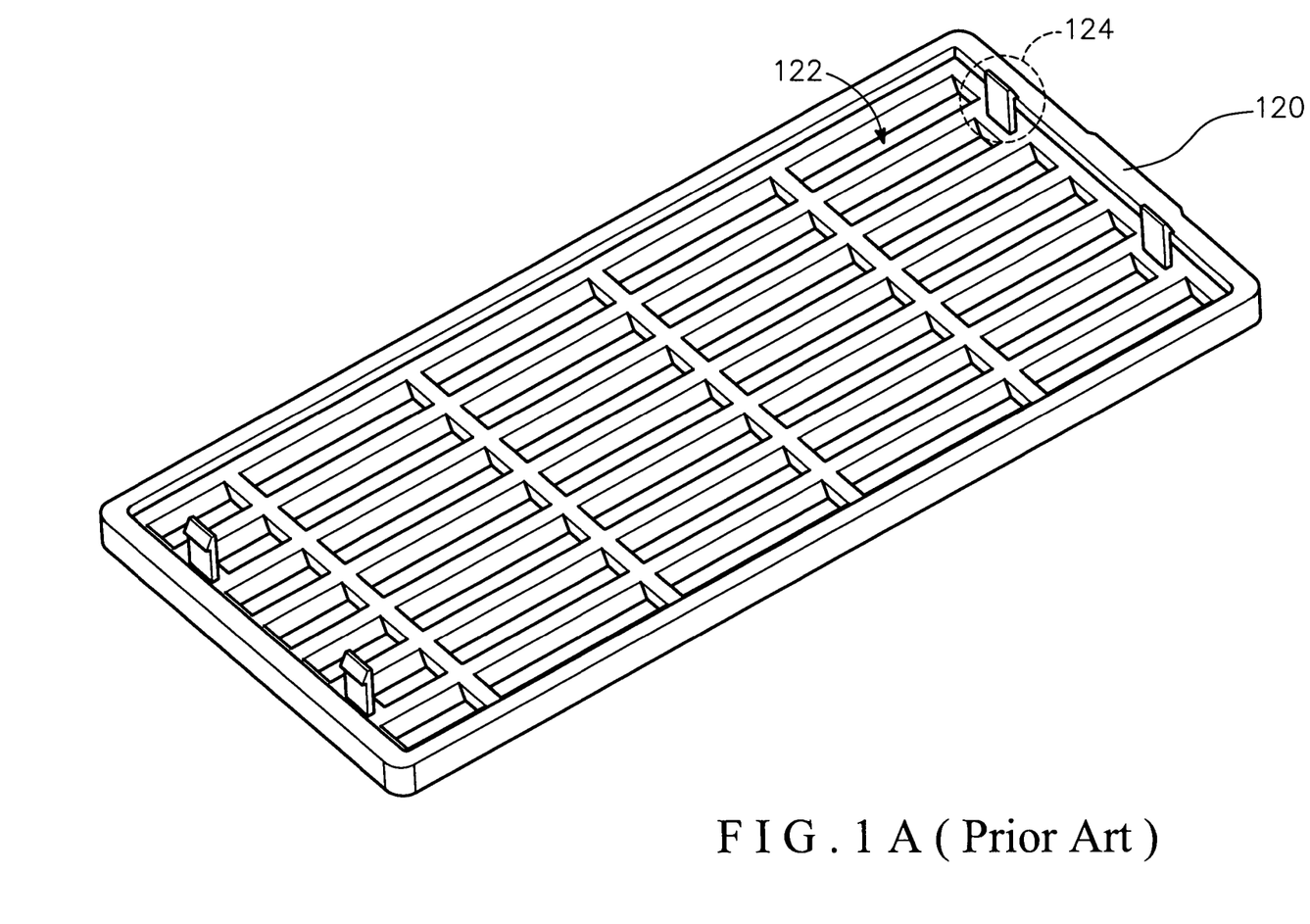
FIG. 1A is a schematic view of the housing in FIG. 1 facing the casing.

FIG. 1 is a schematic view of a typical filter housing structure 100 of a projector. The filter housing structure 100 is disposed on an air vent (not shown) of the projector. The casing 220 of the projector has a plurality rectangle openings 222 thereon, and the rectangle openings 222 has an array distribution at the outlet of the air vent. The filter housing structure 100 is composed of a housing 120 and a filter 140. The housing 120 has a plurality of through holes 122 corresponding to the openings 222 at the outlet of the air vent. FIG. 1A is a schematic view of the housing 120 in FIG. 1 facing the casing 220. As FIG. 1 and FIG. 1A show, there are a plurality of hooks 124 disposed at boundary of the housing 120 for fixing the housing 120 to the openings 222. The filter 140 is disposed between the housing 120 and the casing 220 of the projector for filtering air expelled from the projector.

Noticeably, the housing 120 is fixed to the casing 220 by employing the hooks 124 to extend through the openings 222 to hook the backside surface of the casing 220 of the projector. The openings 222 of the casing 220 need to have enough space for the hooks 124 to pass through the openings 222 of the casing 220. Thus, the size and the position of the hooks 124 may restrict the design of the openings 222 of the casing 220.

Furthermore, the housing 120 is fixed to the casing 220 by the hooks 124, and the hooks 124 are so fragile that improper assembly operation of the housing 120 may break the hooks 124 easily. This problem may be avoided by enlarging the size of the hooks 124. A safety problem for the projector is raised due to the enlarged openings 222 of the casing 200.

SUMMARY OF THE INVENTION

The present invention is to provide a filter housing structure adapted to a projector without using hooks for fixing the casing of the projector. Thus, the size of the openings of the casing may be shrunk down to enhance the safety issue of the projector.

A filter housing structure adapted to a projector is provided in an embodiment of the present invention. A casing of the projector has a plurality of openings arranged in an array. The filter housing structure is fixed on the openings. The filter housing structure includes a first encircled hook-and-loop fastening layer, a housing, a filtering layer, and a second encircled hook-and-loop fastening layer. The first encircled hook-and-loop fastening layer is fixed on the casing and surrounds the openings of the casing. The housing has a central portion and a boundary portion. The central portion has a plurality of through holes corresponding to the openings of the casing. The boundary portion surrounds the central portion and corresponds to the first encircled hook-and-loop fastening layer on the casing. The filtering layer is disposed in the central portion, the filtering layer is disposed between the through holes and the openings, and the filtering layer shields the through holes in the central portion. The second encircled hook-and-loop fastening layer is fixed on the boundary portion of the housing, and the second encircled hook-and-loop fastening layer is located on a side of the boundary portion of the housing facing the casing for fastening the housing to the first encircled hook-and-loop fastening layer.

The housing of the traditional filter housing structure is fixed to the casing of the projector by using the hooks, and thus the size of the openings of the casing may be restricted by the hooks and may not be shrunk down. In addition, in a way of using hooks to fix the filter housing structure, the hooks are easily broken by improper assembly operation of the housing. Though increasing the size of the hooks may prevent above mentioned problem, another safety problem is raised due to the enlarged openings of the casing. Comparatively, the filter housing structure in embodiment of the present invention is fastened to the casing of the projector without using hooks, so that the openings of the casing may be shrunk in a rational range to enhance safety.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The present invention will now be specified with reference to its preferred embodiment illustrated in the drawings, in which.

DESCRIPTION OF THE PRESENT EMBODIMENTS

In the following detailed description of the present embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2:
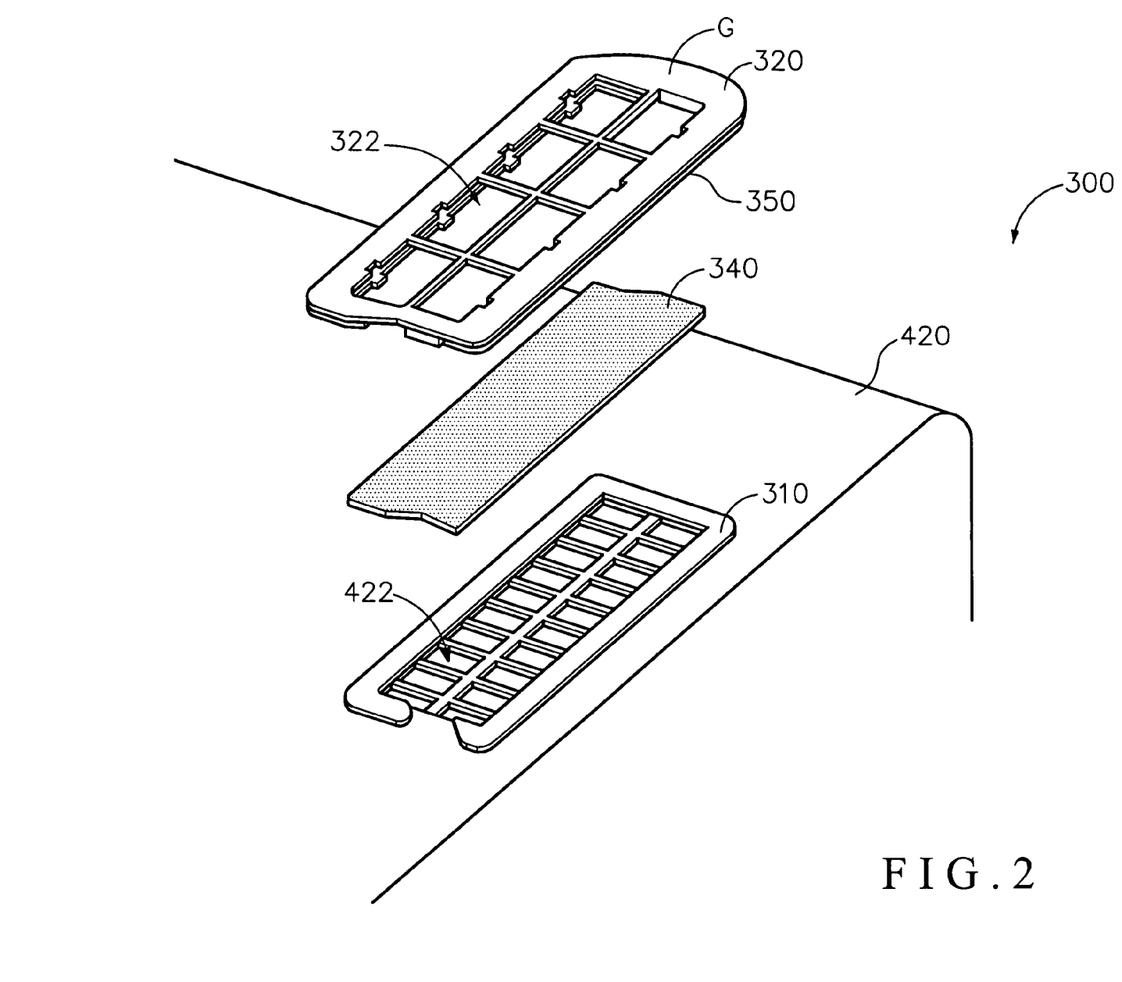
FIG. 2 is an explosive view showing an embodiment of the filter housing structure of the projector according to the present invention.

FIG. 2 is a schematic view showing an embodiment of a filter housing structure 300 according to the present invention. The filter housing structure 300 is adapted to a projector. The projector may be carried by a supporting object such as a desk. A bottom of a casing 420 of the project faces the supporting object. The casing 420 has a plurality of openings 422 thereon arranged in an array. The filter housing structure 300 is fixed above the openings 422. In the present embodiment, the openings 422 are disposed on the bottom of the casing 420 of the projector, and the openings 422 correspond to an air inlet channel (not shown) of the projector as an air inlet for the projector.

Figure 3:
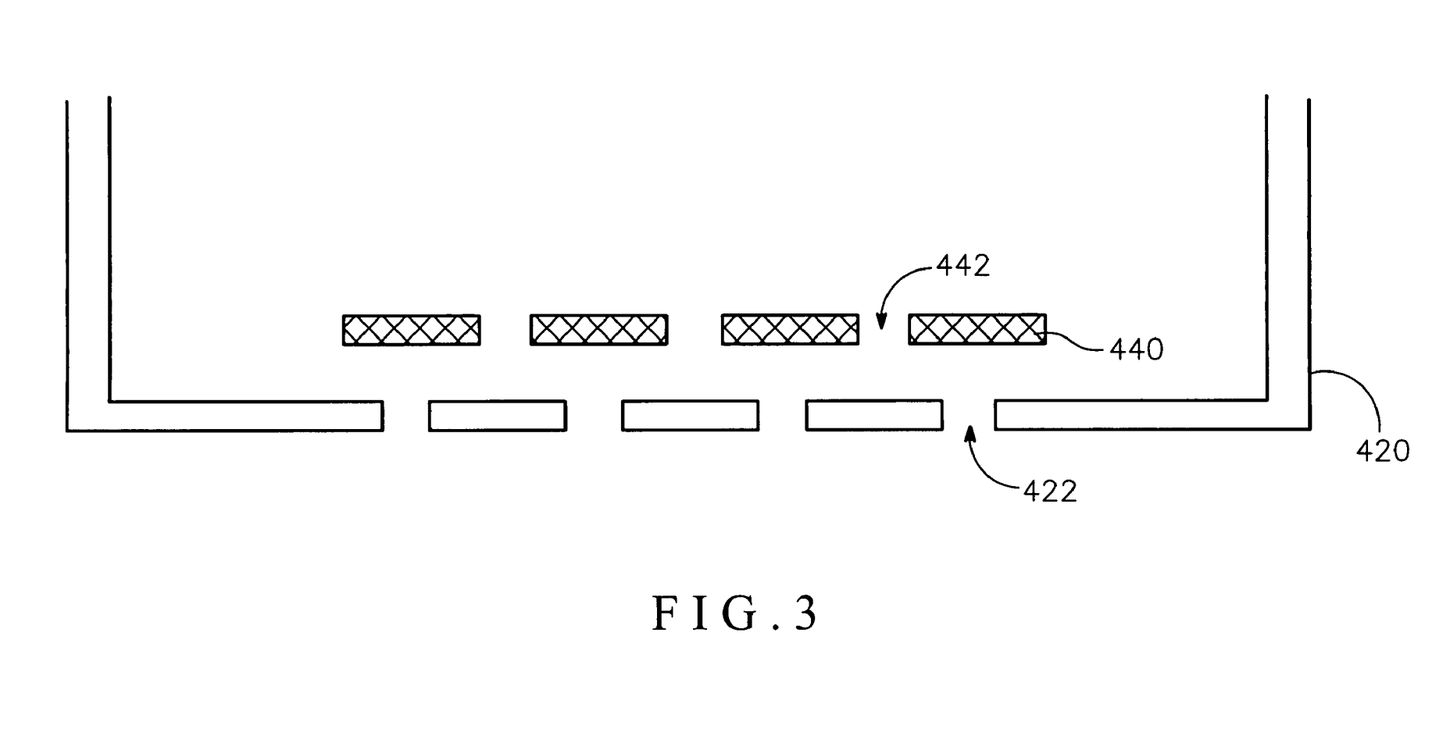
FIG. 3 is a cross-section view showing the baffle plate in the projector according to an embodiment of the present embodiment.

However, the present invention is not limited thereto. The filter housing structure 300 according to the present embodiment may also be disposed on the top or the sidewall of the casing 420 of the projector, and the filter housing structure 300 according to the present embodiment is not limited to correspond to the air inlet channel of the projector. However, since the demand of fire enclosure of the projector is strict for the base of the projector disposed on the desk directly, the size of the openings 422 at the bottom of the casing 420 has special regulations. FIG. 3 is a cross-section view showing a baffle plate in the projector according to an embodiment of the present embodiment. As FIG. 3 shows, under the safety regulation, additionally disposing a baffle plate 440 in the casing 420 near the openings 422 may be required. In addition, the baffle plate 440 has a plurality of openings 442 staggered with the openings 422 of the casing 420.

As FIG. 2 shows, the filter housing structure 300 in the present embodiment includes a first encircled hook-and-loop fastening layer 310, a housing 320, a filtering layer 340, and a second encircled hook-and-loop fastening layer 350. The first encircled hook-and-loop fastening layer 310 is fixed on the casing 420 and surrounds the openings 422 of the casing 420. In the present embodiment, the openings 422 of the casing 420 are arrayed in a rectangular area. The first encircled hook-and-loop fastening layer 310 is fixed on the casing 420 along the boundary of the rectangular area.

Figure 2A:
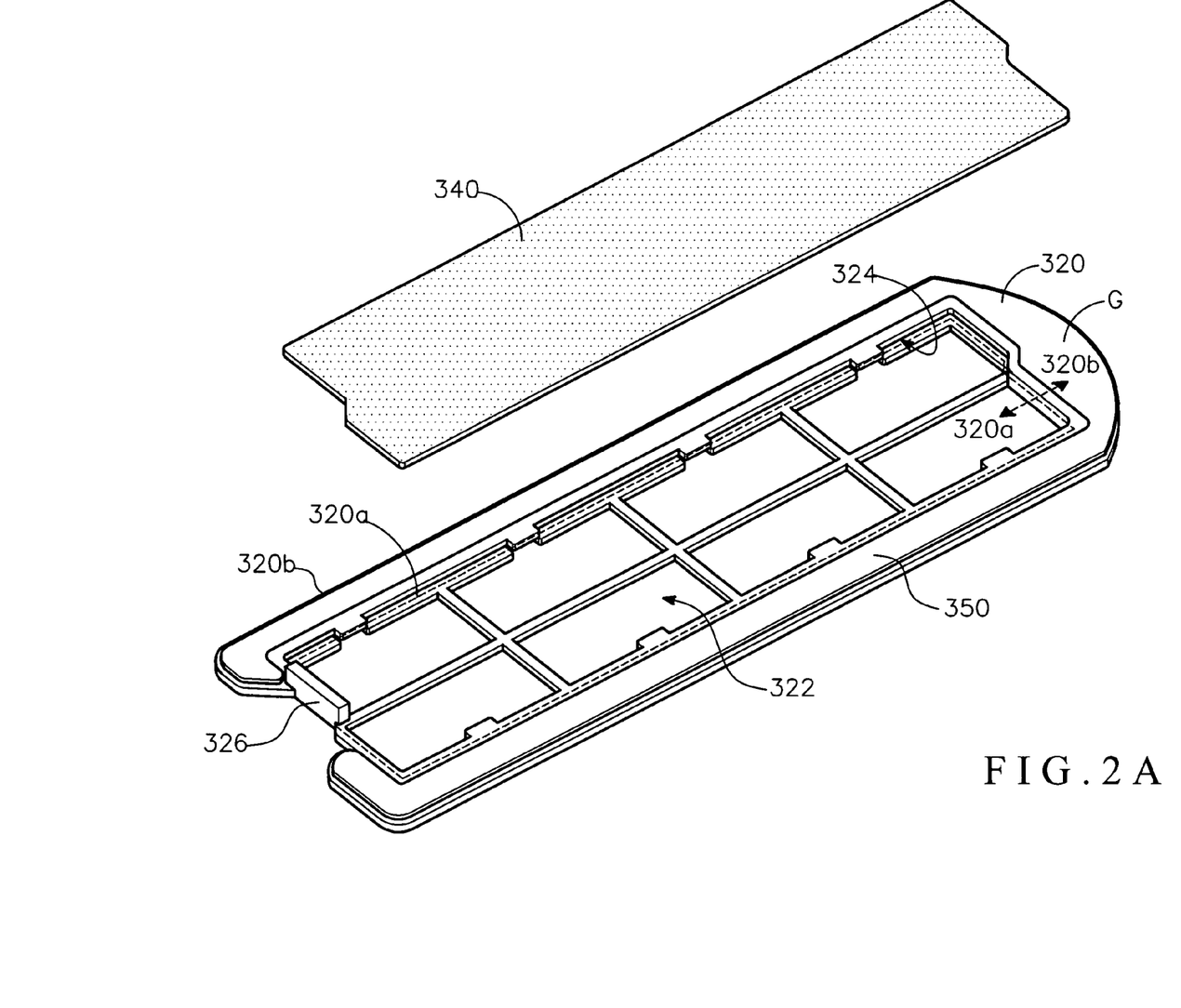
FIG. 2A is a schematic view of the housing in FIG. 2 facing the casing.

FIG. 2A is a schematic view of the housing 320 in FIG. 2 facing the casing 420. As FIG. 2 and FIG. 2A show, the housing 320 has a central portion 320a (encircled by the dashed line) and a boundary portion 320b. The central portion 320a has a plurality of through holes 322 thereon corresponding to the openings 422 of the casing 420. The boundary portion 320b surrounds the central portion 320a and corresponds to the first encircled hook-and-loop fastening layer 310 disposed on the casing 420. In the embodiment, the central portion 320a appears rectangle in shape, and the central portion 320a corresponds to and shields the rectangular area defined by the openings 422 to ensure air passing the openings 422 and passing through the filter housing structure 300.

The filtering layer 340 is disposed in the central portion 320a of the housing 320. The filtering layer 340 is located between the through holes 322 and the openings 422. The filtering layer 340 shields all the through holes 322 of the central portion 320a. When the housing 320 is assembled on the casing 420, the filtering layer 340 shields the openings 422 surrounded by the first encircled hook-and-loop fastening layer 310. The second encircled hook-and-loop fastening layer 350 is fixed on the side of the boundary portion 320b of the housing 320 facing the casing 420 to fasten the housing 320 to the first encircled hook-and-loop fastening layer 310.

Figure 2B:
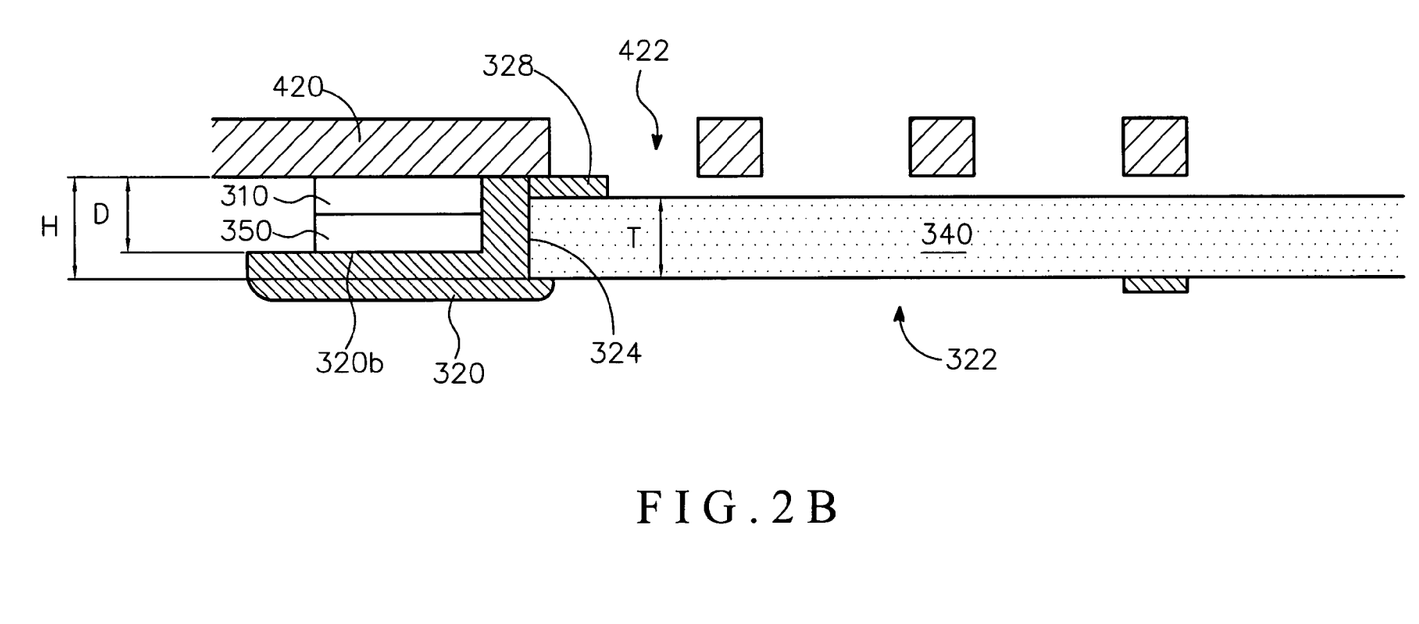
FIG. 2B is a cross-section view showing the filter housing structure in FIG. 2 assembled to the casing.

In the present embodiment, the housing 320 has an encircled wall 324 disposed between the central portion 320a and the boundary portion 320b. The encircled wall 324 extends toward the casing 420 to define a space in the central portion 320a by a side of the housing 320 facing the casing 420 for holding the filtering layer 340. FIG. 2B is a cross-section view showing the filter housing structure 300 in FIG. 2 assembled to the casing 420. As FIG. 2B shows, for the housing 320 is fastened to the casing 420 by using the first encircled hook-and-loop fastening layer 310 and the second encircled hook-and-loop fastening layer 350, a distance D between a upper of the encircled wall 324 facing the casing 420 and a surface of the boundary portion 320b facing the casing 420 is smaller than a thickness sum of the thickness of the first encircled hook-and-loop fastening layer 310 and the thickness of the second encircled hook-and-loop fastening layer 350, so as to ensure the first encircled hook-and-loop fastening layer 310 combining the second encircled hook-and-loop fastening layer 350 effectively.

As FIG. 2B shows, when the filter housing structure 300 is assembled on the casing 420, the upper of the encircled wall 324 of the housing 320 facing the casing 420 is attached to the casing 420. The filtering layer 340 is made of compressible material. In an embodiment, as FIG. 2A shows, the top of the encircled wall 324 has a lock structure 328 for fixing the filtering layer 340 vertically. In addition, also referring to FIG. 2B, after the filtering layer 340 is compressed, the filtering layer 340 is fixed between the openings 422 and the through holes 322 by the lock structure 328. However, the present invention is not limited in the above mentioned. In another embodiment (not shown), the outer surface of the casing 420 is used to restrict the filtering layer 340 vertically. Under this circumstance, the thickness T of the filtering layer 340 is larger than a height H of the encircled wall 324 with respect to the surface with the through holes 322 facing the openings 422, so that the filtering layer 340 may be firmly attached to the openings 422 of the housing 420. Moreover, in order to avoid the situation that the encircled wall 324 fails to contact the surface of the casing 420 due to an over-thick filtering layer 340, air may leak through the gap between the encircled wall 324 and the casing 420 easily. Thus, in the present embodiment, the thickness of the filtering layer 340 is smaller than 1.5 times the height H of the encircled wall 324 with respect to the surface with the through holes 322 facing the openings 422.

Referring to FIG. 2 and FIG. 2A, in the present embodiment, the first encircled hook-and-loop fastening layer 310 and the second encircled hook-and-loop fastening layer 350 are substantially in the same shape and size, and the first encircled hook-and-loop fastening layer 310 and the second encircled hook-and-loop fastening layer 350 are fabricated to match the boundary portion 320b. The width of the boundary portion 320b is substantially kept constant, and the width of a grasping zone G of the boundary portion 320b is wider. The grasping zone G is corresponding to a short side of the central portion 320a, and the grasping zone G is used for disassembling of the housing 320. For an embodiment of the present invention, the grasping zone G is not shielded by the second encircled hook-and-loop fastening layer 350. When the housing 320 is assembled on the casing 420, the grasping zone G extends outside of the first encircled hook-and-loop fastening layer 310 for users to disassemble the housing 320.

Furthermore, the central portion 320a of the housing 320 shields the openings 422 arrayed on the casing 420 for ensuring air passing the openings 422 of the casing 420 and passing through the filter housing structure 300 in the present embodiment. In addition, in order to satisfy positioning requirement and simplify assembling process of the filter housing structure 300, as FIG. 2A shows, the housing 320 has at least a positioning structure 326 at the margin of the central portion 320a extending toward the casing 420 and corresponding to a sidewall of one of the openings 422 of the casing 420.

In the present embodiment, the first encircled hook-and-loop fastening layer 310 is shielded by wrapped wires. The second encircled hook-and-loop fastening layer 350 is shielded by soft fuzz or circular fibers. The wrapped wires of the first encircled hook-and-loop fastening layer 310 may hook the soft fibers of the second encircled hook-and-loop fastening layer 350, so as to fix and replace the housing 320 easily with the help of the first encircled hook-and-loop fastening layer 310 and the second encircled hook-and-loop fastening layer 350 fixed on the casing 420. The housing 320 may avoid the risk of breaking the hooks 124. However, the present invention is not limit to the above mentioned. The surface structure of the first encircled hook-and-loop fastening layer 310 and the surface structure of the second encircled hook-and-loop fastening layer 350 may be exchanged with the fastening ability unchanged.

In FIG. 1, the housing 120 of the filter housing structure 100 is fixed to the casing 220 of the projector by using the hooks 124, thus the openings 222 of the casing 220 may preserve enough space for the hooks 124 to pass through the openings 222 to reach the inner surface of the casing 220. However, the hooks 124 are easily broken by improper operation of the housing 120. Though increasing the size of the hooks 124 may prevent above mentioned problem, another safety problem of the projector is raised due to the enlarged openings 222 of the casing 220 for locating the hooks 124. Comparatively, as FIG. 2 shows, the filter housing structure 300 in the present embodiment of the present invention is fastened to the casing 420 of the projector without the need of hooks, so that the size of the openings 422 of the casing 420 may be shrunk in a rational range to enhance safety. For an embodiment, referring to FIG. 2, the size of the openings 422 of the casing 420 is smaller than the size of the through holes 322 of the central portion 320a.

In addition, since the filter housing structure 300 in the present embodiment of the present invention may not need the hooks, the risk of breaking the hooks during assembly or disassembly may be prevented. Furthermore, the filter housing structure 300 has the positioning structure 326 corresponding to the openings 422 of the casing 420 so as to ensure the housing 320 to be correctly assembled on the casing 420, and the circumstances of incorrect assembly may be avoided.

The foregoing description of the present embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suitable for the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A filter housing structure, adapted to a projector, the projector having a casing, the casing having a plurality of openings, the filter housing structure comprising:
    a first encircled hook-and-loop fastening layer, fixed on the casing and surrounding the openings of the casing;
    a housing, comprising a central portion and a boundary portion, wherein the central portion has a plurality of through holes corresponding to the openings of the casing and the boundary portion surrounds the central portion and corresponds to the first encircled hook-and-loop fastening layer, and wherein the housing has a positioning structure disposed at a margin of the central portion and the positioning structure corresponds to a side of one of the openings of the casing for positioning the housing;
    a filtering layer, disposed in the central portion, disposed between the through holes and the openings of the casing, and shielding the through holes; and
    a second encircled hook-and-loop fastening layer, fixed on the boundary portion for fastening the housing to the first encircled hook-and-loop fastening layer.

2. The filter housing structure of claim 1, wherein the openings of the casing are disposed at a bottom of the casing of the projector and the bottom is adapted to face an object supporting the projector.

3. The filter housing structure of claim 1, further comprising a baffle plate disposed in the casing and adjacent to the openings of the casing.

4. The filter housing structure of claim 3, wherein a plurality of openings of the baffle plate are staggered with the openings of the casing.

5. The filter housing structure of claim 1, wherein the openings of the casing are an air inlet of the projector.

6. The filter housing structure of claim 1, wherein the housing has a encircled wall between the central portion and the boundary portion and the encircled wall extends toward the casing and defines a space in the central portion by a side of the housing facing the casing for holding the filtering layer.

7. The filter housing structure of claim 6, wherein a distance between an upper of the encircled wall facing the casing and a surface of the boundary portion facing the casing is smaller than a thickness sum of the first encircled hook-and-loop fastening layer and the second encircled hook-and-loop fastening layer.

8. The filter housing structure of claim 6, wherein a thickness of the filtering layer is smaller than 1.5 times a height of the encircled wall with respect to a surface with the through holes facing the openings of the casing.

9. The filter housing structure of claim 1, wherein the central portion is rectangle in shape.

10. The filter housing structure of claim 9, wherein the boundary portion has a grasping zone corresponding to a short side of the central portion and the grasping zone extends to an outside of the first encircled hook-and-loop fastening layer.

11. The filter housing structure of claim 1, wherein the openings of the casing are arranged in an array.

12. The filter housing structure of claim 1, wherein the first encircled hook-and-loop fastening layer is combined with the second encircled hoop-and-loop fastening layer by using a wrapped wire to hook a soft fiber.

* * * * *